United States Patent [19]

Perry et al.

[11] Patent Number: 5,235,660
[45] Date of Patent: Aug. 10, 1993

[54] GRADED POLYMER OPTICAL FIBERS AND PROCESS FOR THE MANUFACTURE THEREOF

[75] Inventors: Gregory A. Perry, Dunwoody; Clifford E. Witcher, Lawrenceville, both of Ga.

[73] Assignee: Peachtree Fiberoptics, Inc., Norcross, Ga.

[21] Appl. No.: 911,522

[22] Filed: Jul. 10, 1992

[51] Int. Cl.$^5$ ................................ G02B 6/18
[52] U.S. Cl. ................................ 385/124; 385/143; 385/145; 264/1.5
[58] Field of Search ............ 385/124, 126, 127, 128, 385/143, 145; 264/1.5

[56] References Cited

U.S. PATENT DOCUMENTS

| | | | |
|---|---|---|---|
| 3,816,160 | 6/1974 | Moore | 385/124 |
| 3,999,834 | 12/1976 | Ohtomo et al. | 385/124 |
| 4,521,351 | 6/1985 | Ohtsuka et al. | 264/1.5 |
| 4,552,431 | 11/1985 | Allemand et al. | 385/143 |
| 4,575,188 | 3/1986 | Ueba | 385/141 |
| 4,587,065 | 5/1986 | Kouichi et al. | 264/1.5 |
| 4,681,400 | 7/1987 | Ueba et al. | 385/143 |
| 4,712,854 | 12/1987 | Mikami et al. | 385/124 |
| 4,822,122 | 4/1989 | Yamamoto et al. | 385/124 |
| 5,175,786 | 12/1992 | Toyoda et al. | 385/124 |

OTHER PUBLICATIONS

Article from *Photonics Spectra*, pp. 120-2, 124-6, 128, Designing Plastic Optics for Manufacturing, May 1991.

*Primary Examiner*—Frank Gonzalez
*Attorney, Agent, or Firm*—Jones & Askew

[57] ABSTRACT

A process for the manufacture of a multi-layer polymer optical fiber having a graded optical refractive index profile. This fiber is comprised of an inner core layer, one or more intermediate layers and an outer clad layer, each layer being extruded from a polymer material. All layers are arranged in a concentric configuration, with the outer clad layer enclosing all other layers.

15 Claims, 3 Drawing Sheets

GRADED POLYMER OPTICAL FIBERS AND PROCESS FOR THE MANUFACTURE THEREOF

TECHNICAL FIELD

This invention relates to a process for the manufacture of a polymer optical fiber. More specifically, this invention relates to a process for the manufacture of a polymer optical fiber having a graded optical refractive index profile.

BACKGROUND OF THE INVENTION

For purposes of this invention, the term "polymer optical fiber" is defined as a fiber (or thin, flexible rod) with a core layer within which light travels and a clad layer which confines the light to the core. The clad layer also provides mechanical strength and protection to the core.

Polymer optical fibers were developed as alternatives to copper cable and glass fibers. The primary objectives for such development were to lower manufacturing costs, to increase mechanical and optical performance capabilities and to simplify the manufacturing process.

Currently, polymer optical fibers (POF) have a wide range of uses, such as electronics, medical, automotive, industrial, defense and communication. For purposes of simplification, these uses can be categorized as either imaging and illumination or communications. The POF competes with glass optical fibers and copper cable in short distance communications applications and competes with glass optical fibers in imaging and illumination applications.

One technical limitation of POF is the lack of an effective process which will consistently and reliably produce a POF having a graded optical refractive index. In communications applications, especially data communications, a graded optical refractive index profile enables POF to have increased performance capabilities, such as their use for computer connections in networks and in computers for carrying data.

For various reasons, the current processes do not consistently and reliably produce a POF with a suitable graded optical refractive index profile. Therefore, a need exists in the industry for this type of process.

SUMMARY OF THE INVENTION

The existing need as described above is met by the present invention which, in general terms, provides an effective process for the manufacture of a multi-layer polymer optical fiber having a graded optical refractive index profile. In addition, the process of this invention produces a polymer optical fiber which is comprised of at least two polymer material layers arranged in a concentric configuration and enclosed within an outer clad layer.

More specifically, the present invention provides a process for the manufacture of a multi-layer polymer optical fiber having a graded optical refractive index profile and being comprised of at least two polymer material layers arranged in a concentric configuration and enclosed within an outer clad layer, wherein the process comprises the sequential steps of:

A. producing a preform polymer optical fiber by extruding first and second layers of polymer materials and an outer clad layer of a polymer material; wherein the first polymer material layer has a predetermined optical refractive index and forms the fiber core, the second polymer material layer encircles the fiber core and has an optical refractive index which is lower than such index of the first layer, and the outer clad layer encircles the second layer and has an optical refractive index which is lower than such index of the second layer; and wherein the first, second and clad layers are arranged in a concentric configuration;

B. cooling the preform polymer optical fiber;

C. heating the preform polymer optical fiber to a temperature to effect fusing of the polymer layers at their respective interfaces;

D. drawing the heated preform polymer optical fiber to a predetermined diameter; and E. cooling the multi-layer polymer optical fiber, whereby such fiber has a graded optical refractive index profile.

The present invention also provides a multi-layer polymer optical fiber having a graded optical refractive index profile and being comprised of at least two polymer material layers arranged in a concentric configuration and enclosed within an outer clad layer, wherein such fiber is produced by a process as defined in the preceding paragraph.

The present invention provides a process for the manufacture of a multi-layer polymer optical fiber having a graded optical refractive index profile and being comprised of an inner fiber core layer, an outer clad layer and one or more intermediate layers arranged in a concentric configuration, wherein the process comprises the sequential steps of:

A. producing a preform polymer optical fiber by extruding an inner core layer, an outer clad layer and one or more intermediate layers, each layer being formed of a polymer material; wherein the fiber core layer has a predetermined optical refractive index, wherein each intermediate layer encircles the fiber core and each immediately preceding intermediate layer, wherein each intermediate layer has an optical refractive index which is lower than such index of the fiber core layer and each immediately preceding intermediate layer, wherein the outer clad layer encircles the last intermediate layer and has an optical refractive index which is lower than such index of the last intermediate layer, and wherein the inner core layer, the outer clad layer and each intermediate layer are arranged in a concentric configuration;

B. cooling the preform polymer optical fiber;

C. heating the preform polymer optical fiber to a temperature to effect fusing of the polymer layers at their respective interfaces;

D. drawing the heated preform polymer optical fiber to a predetermined diameter; and E. cooling the multi-layer polymer optical fiber, whereby such fiber has a graded optical refractive index profile.

The sequence of steps in the process of this invention is critical. If these steps are not sequential, a POF of this invention is not obtained.

The polymer optical fiber produced by this invention can be effectively used in various applications as alternatives to copper cable and glass optical fibers. These applications include imaging and illumination applications and communications applications, especially in data communications.

Accordingly, an object of the present invention is to provide a polymer optical fiber.

Another object of the present invention is to provide a fiber having a graded optical refractive index profile.

Another object of the present invention is to provide a fiber having a graded optical refractive index profile and being comprised of at least two polymer material layers arranged in a concentric configuration and enclosed within an outer clad layer.

A further object of the present invention is to provide a process for the manufacture of a polymer optical fiber.

A further object of the present invention is to provide a process for the manufacture of a polymer optical fiber having a graded optical refractive index profile.

A further object of the present invention is to provide a process for the manufacture of a polymer optical fiber having a graded optical refractive index profile and being comprised of at least two polymer material layers arranged in a concentric configuration and enclosed within an outer clad layer.

A still further object of the present invention is to provide a polymer optical fiber which has a graded optical refractive index and which is useful in imaging and illumination applications and in communications applications.

These and other objects, features and advantages of the present invention will become apparent from the following detailed description, when taken in conjunction with the drawings and claims.

DETAILED DESCRIPTION OF THE DRAWINGS

Figure 3:
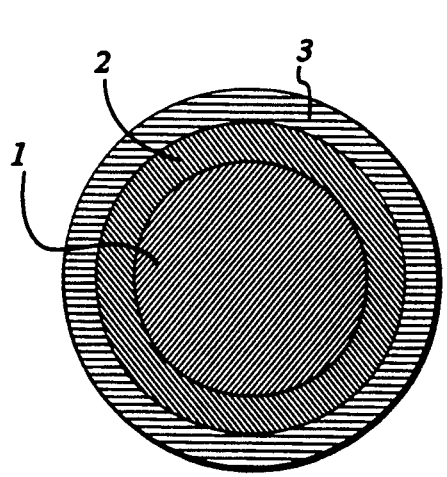
FIG. 3 is a cross-sectional view of a three-layer polymer optical fiber according to this invention in which the two-layer fiber of FIG. 2 is encircled by a third layer of polymer material.
Figure 4:
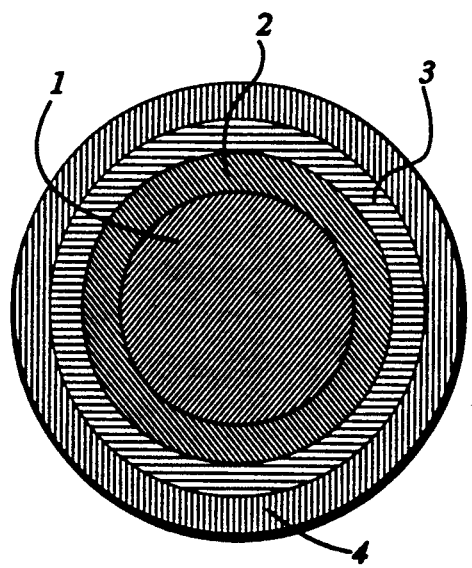
FIG. 4 is a cross-sectional view of a multi-layer polymer optical fiber according to this invention in which the three-layer fiber of FIG. 3 is enclosed within an outer clad layer of polymer material.

Referring now in more detail to the drawings, in which like numerals refer to like parts throughout the several views, FIG. 4 shows a multi-layer polymer optical fiber manufactured in accordance with this invention. More particularly, in FIG. 4 the outer clad layer 4 has been added to the inner fiber structure progressively manufactured in FIGS. 1-3.

Figure 1:
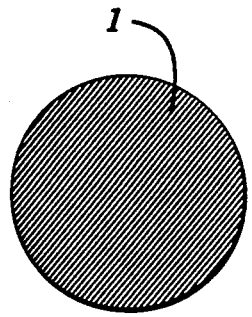
FIG. 1 is a cross-sectional view of the core layer of a polymer optical fiber according to this invention.
Figure 2:
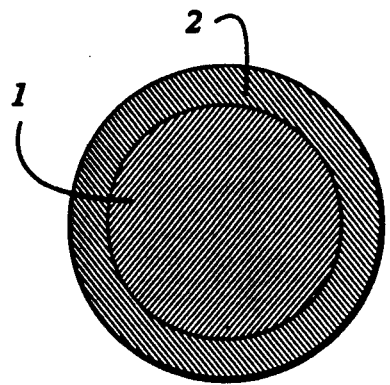
FIG. 2 is a cross-sectional view of a two-layer polymer optical fiber according to this invention in which the core layer of FIG. 1 is encircled by a second layer of polymer material.

A polymer material is extruded to form the inner fiber core 1 as shown in FIG. 1. A second polymer material is extruded to form fiber layer 2 which encircles fiber core 1 as shown in FIG. 2. A third polymer material is extruded to form fiber layer 3 which encircles fiber layer 2 as shown in FIG. 3. A fourth polymer material is extruded to form the outer clad layer 4 which encircles fiber layer 3. Indirectly, as shown in FIG. 4, the outer clad layer 4 also encircles fiber layer 2 and the inner fiber core 1.

In FIGS. 1-4, the several extrusions are preferably conducted simultaneously, and the several layers are extruded in a concentric configuration. With a concentric configuration, the polymer optical fiber of this invention will have the desired graded optical refractive index profile.

Figure 5:
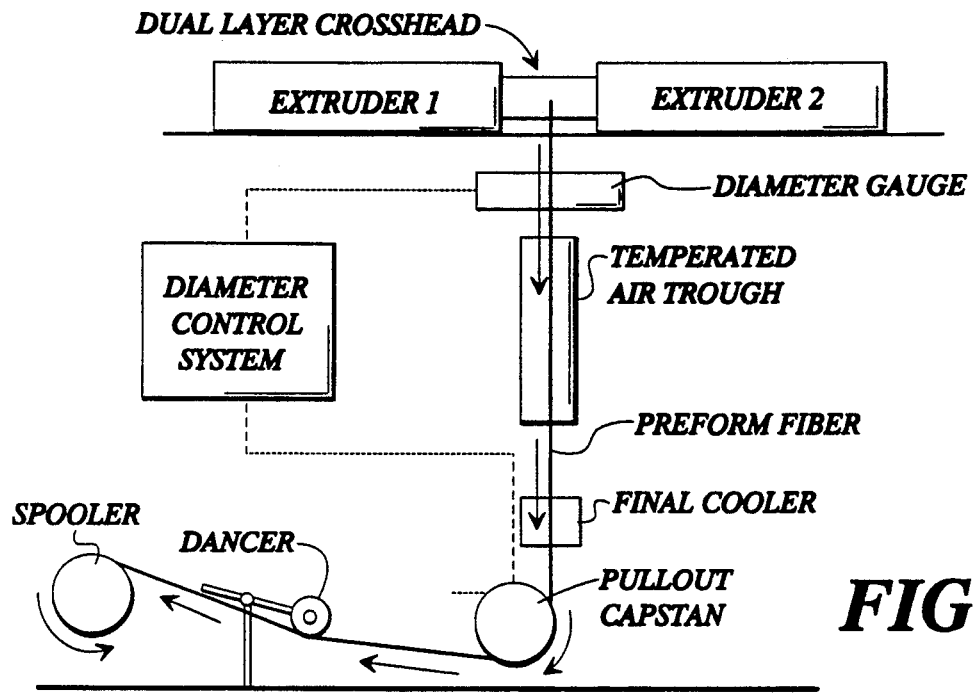
FIG. 5 is a schematic view of the process and apparatus which can be used to produce a preform polymer optical fiber according to this invention.
Figure 6:
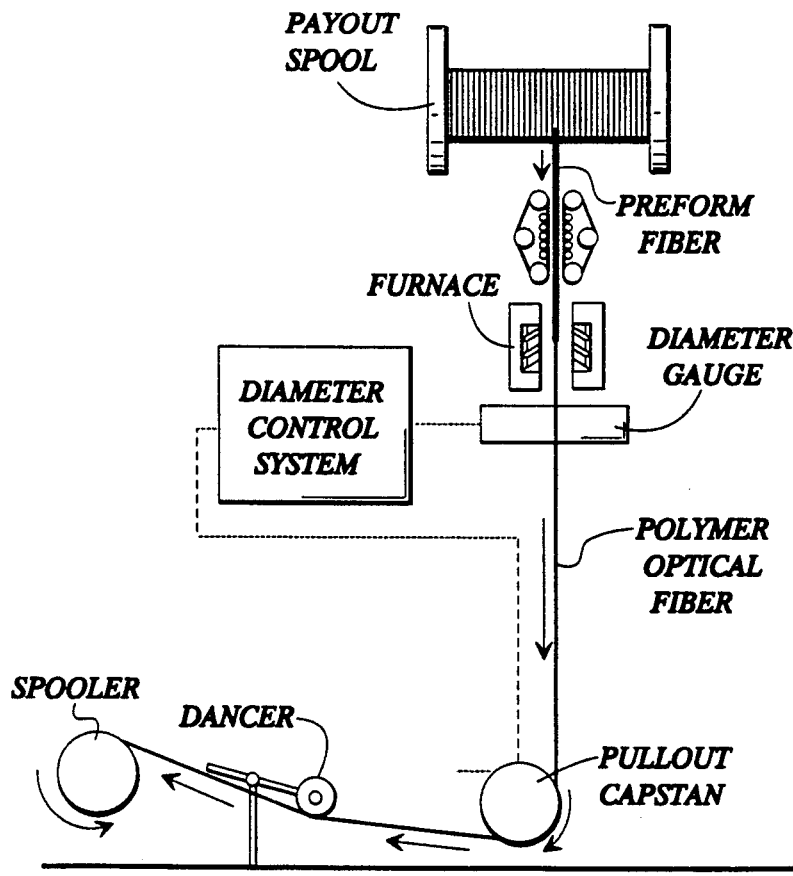
FIG. 6 is a schematic view of the process and apparatus which can be used to change the preform polymer optical fiber into the polymer optical fiber according to this invention.

With regard to the process of manufacturing the polymer optical fiber of this invention, reference is made to FIGS. 5-6 which illustrate the preferred embodiment of such process.

More particularly, FIG. 5 shows a multiple extrusion apparatus adapted to simultaneously extrude multi-layers of polymer materials. In FIG. 5, extruders 1 and 2 are each adapted to simultaneously extrude more than one polymer material in a conjunctive fashion. Although the various apparatus components shown in FIG. 5 are conventional and well-known in this industry, the arrangement of these components is preferably in a vertical plane, which is not conventional.

For purpose of describing the preferred embodiment of the process of this invention, FIGS. 5-6 are more specifically described as follows. Extruders A and B are designed to melt and homogenize a variety of thermoplastic polymers which melt in a temperature range of from about 200° F. to about 750° F. Although these extruders are shown as the heat source, other sources of heat can be used if such other sources will produce and sustain the indicated melt temperature range. The extrusion apparatus shown in FIG. 5 can be altered either to include one or more additional extruders or a single multi-layer extruder can be used in a conventional coextrusion arrangement.

Three polymers in raw material form (pellets, powder, etc.) are loaded into their respective extruders. One polymer will form the inner fiber core, the second will form an intermediate layer and the third will form the outer clad layer.

In this invention, each polymer material layer will have an optical refractive index of from about 1.2 to about 1.95. Furthermore, each layer will have a different optical refractive index. Specifically, in this embodiment, the intermediate layer will have an index which is lower than the core layer, and the clad layer will have an index which is lower than the intermediate layer. In general terms for all embodiments of this invention, the optical refractive index will decrease from the core layer to each layer moving outwards from the core layer, with the outer clad layer having the lowest index.

With regard to the polymers which are useful in the practice of this invention, such polymers include polycarbonates (such as those sold by General Electric Company under the trademark Lexan), polyesters, polyolefins, acrylic polymers (such as those sold by Cyro Industries under the trademark Acrylite) and other thermoplastic polymers. Another example of a suitable acrylic polymer is polymethyl methacrylate.

The extruders shown in FIG. 5 must be arranged so that the extruded preform polymer optical fiber has the necessary characteristics with regard to optical refractive indices of the various layers. The screws in such extruders feed the respective polymers at a controlled rate to insure homogeneity and proper melt temperature to the crosshead according to conventional extrusion principles. The tooling and component parts in the crosshead closely and accurately govern the diameter and ratios of the extruded preform fibers.

After extrusion, the preform fiber preferably travels through a diameter gauge, tempered air trough and a cooling device, then travels around a pullout capstan and dancer roll and finally is collected on a spooler, as shown in FIG. 5. The diameter gauge measures the diameter of the preform fiber after extrusion and compares such measurement to a predetermined diameter setpoint. If a difference is detected, the diameter control system will either increase or decrease the speed of the pullout capstan until the difference is corrected.

The transition of the preform fiber from a molten state to a solid state must be carefully and accurately controlled. As shown in FIG. 5, the preform fiber travels through a tempered air trough, a device which can vary in length (e.g., from about 1–30 feet). The temperated air trough allows the temperature transition to be accomplished in a controlled and gradual manner by using a series of thermocouples and by controlling the tempered forced air to achieve the desired temperature profile. The trough is designed with adjustable baffles such that the preform fiber is not subjected to any turbulence due to the internal air flows. The diameter of the preform fiber will affect the positioning of the baffles and the amount of air flow which is necessary to achieve the desired temperature profile.

As shown in FIG. 5, the final cooler is used to provide a molecular sized water mist through which the preform fiber is passed. As the mist contacts the preform fiber, the molecules begin the evaporation process, resulting in the dissipation of heat from the preform fiber.

Figure 8:
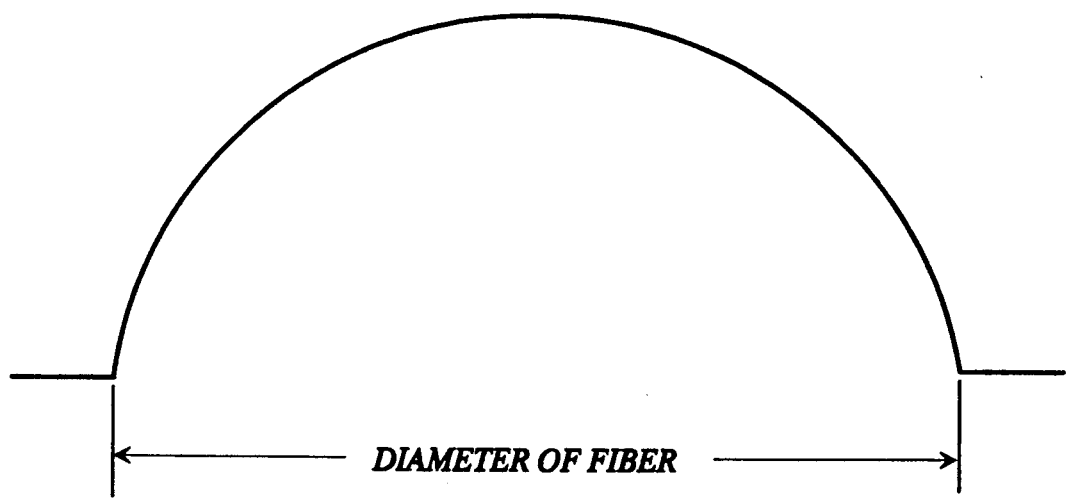
FIG. 8 is a schematic view of the graded optical refractive index profile of the polymer optical fiber according to this invention.

In the preferred embodiment of this invention, another step is taken to change the preform fiber into the final polymer optical fiber having the desired graded optical refractive index profile. As can be seen in FIG. 8, this profile is a parabolic curve shaped profile.

This additional step is illustrated in FIG. 6. The spooler containing the preform fiber (in FIG. 5) is taken and placed at a point directly over a heat source (e.g., a furnace). The preform fiber is then fed by a tractor device from the spooler into the furnace, which is operating in a temperature range of from about 200° to about 1000° F., depending on the composition of the preform fiber. The furnace heats the preform fiber to a melt temperature, which causes the end of the preform fiber to "ball up" or coagulate. The ball at the end of the preform fiber is then lowered (such as by gravity) to the pullout capstan while remaining attached to the original preform fiber. After the desired diameter is achieved, the final polymer optical fiber is collected on the spooler for subsequent use. The diameter control system, which in FIG. 6 is located immediately past the furnace, coordinates the speed of the tractor device and the pullout capstan to maintain, or correct for, a predetermined diameter setpoint. The process illustrated in FIG. 6 continues until the spooler of preform fiber is empty.

Figure 7:
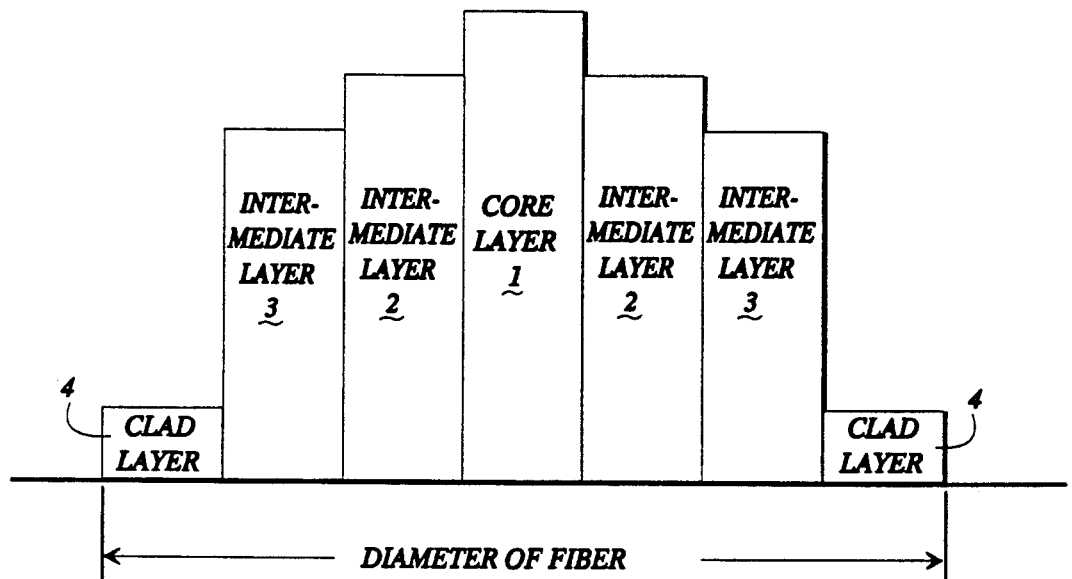
FIG. 7 is a schematic view of the optical refractive index profile of the preform polymer optical fiber according to this invention.

As the present invention involves re-heating the polymers of the preform fiber to a melt temperature, and as each of the polymer layers has a different optical refractive index and different specific gravities, there will be some molecular dispersion of the polymer layers into the adjoining layers. This action will smooth out the quasi-graded optical refractive index profile of the preform fiber (as shown in FIG. 7) into the desired parabolic cure shaped or graded optical infractive index profile as shown in FIG. 8. Consequently, the final polymer optical fiber of this invention will exhibit the characteristics of an increase in bandwidth or information carrying capacity.

As purity of the inner core layer is essential to obtain a low loss polymer optical fiber, and as the core is exposed to atmosphere throughout this process, precautions must be taken in the ambient atmosphere to insure the purity of the core layer.

Although the above-described process utilizes two extruders (in FIG. 5), a single extruder can be used or, alternatively, multiple extruders can be used. An extruder for each polymer material can also be used.

Additionally, in another embodiment of this invention, the preform fiber can be made (as shown in FIG. 5) with an inner core layer and a second layer, but without an outer clad layer. The spooler containing this preform fiber is then taken and placed directly above the dual layer crosshead, which must be altered to allow rear entry of the preform fiber and to achieve the goal of applying one or more polymer layers which, in turn, increases the diameter of the preform fiber.

The following formula can be used to determine the numerical aperture (N.A.) of the final polymer optical fiber:

$$N.A. = \sqrt{n_1^2 - n_2^2}$$

wherein the term "numerical aperture" is defined as the angle of light acceptance into the final polymer optical fiber. In this formula, $n_1$ is the optical refractive index of the starting polymer material, and $n_2$ is the optical refractive index of the final polymer material.

In this alternative embodiment, the preform fiber then travels through the crosshead where one or more polymer layers are added by conventional extrusion techniques. Again with reference to FIG. 5, the preform fiber then travels through the diameter gauge, temperated air trough and cooling device, around the pullout capstan, over the dancer roll and collected on the spooler. This process continues until the starting spooler of preform fiber is exhausted. The preform fiber is then further processed, as illustrated in FIG. 6, to decrease the oversized diameter and thereby obtain a final polymer optical fiber having the desired diameter.

The preform fiber produced by this invention has an internal optical refractive index profile which is stepped or quasi-graded. The additional processing as shown in FIG. 6 produces a final product with the desired diameter and a graded optical refractive index profile having an alpha value of from about 1.8 to about 3.0.

The manufacture of the preform fibers can also be done in a one-step process by use of a single extruder, by tandomizing multiple extruders or by otherwise configuring multiple extruders.

The process of this invention can be used to manufacture a polymer optical fiber having at least 3 or more polymer material layers, including the inner core layer and the outer clad layer. Thus, the number of "intermediate layers" is not restricted. The cross-section of a polymer optical fiber manufactured according to this invention and having a total of 4 layers is shown in FIGS. 4 and 7. This type of fiber is sequentially structured as shown by the cross-sections of FIGS. 1-4.

Regardless of the total number of layers in a polymer optical fiber produced by this invention, the optical refractive index of each layer (including the core and clad layers) will decrease moving from the inner core layer (highest) through each intermediate layer to the outer clad layer (lowest). This feature is essential to achieving a graded optical refractive index profile as shown in FIG. 8.

While this invention has been described in detail with particular reference to certain embodiments, variations and modifications can be made without departing from the spirit and scope of the present invention as defined in the following claims.

What is claimed is:

1. A process for the manufacture of a multi-layer polymer optical fiber having a graded optical refractive index profile and being comprised of at least two polymer material layers arranged in a concentric configuration and enclosed within an outer clad layer, wherein the process comprises the sequential steps of:
   A. producing a preform polymer optical fiber by extruding first and second layers of polymer materials and an outer clad layer of a polymer material; wherein the first polymer material layer has a predetermined optical refractive index and forms the fiber core, the second polymer material layer encircles the fiber core and has an optical refractive index which is lower than such index of the first layer, and the outer clad layer encircles the second layer and has an optical refractive index which is lower than such index of the second layer; and wherein the first, second and clad layers are arranged in a concentric configuration;
   B. cooling the preform polymer optical fiber;
   C. heating the preform polymer optical fiber to a temperature to effect fusing of the polymer layers at their respective interfaces;
   D. drawing the heated preform polymer optical fiber to a predetermined diameter; and
   E. cooling the multi-layer polymer optical fiber, whereby such fiber has a graded optical refractive index profile.

2. A process as defined by claim 1 wherein the polymer optical fiber has a graded optical refractive index profile having an alpha value of from about 1.8 to about 3.0.

3. A process as defined by claim 1 wherein each of the first, second and clad layers of polymer materials has a graded optical refractive index of from about 1.2 to about 1.95.

4. A process as defined by claim 1 wherein the first polymer material layer is a polycarbonate.

5. A process as defined by claim 1 wherein the second polymer material layer is a polycarbonate.

6. A process as defined by claim 1 wherein the outer clad layer is an acrylic polymer.

7. A process as defined by claim 6 wherein the acrylic polymer is polymethyl methacrylate.

8. A multi-layer polymer optical fiber having a graded optical refractive index profile and being comprised of at least two polymer material layers arranged in a concentric configuration and enclosed within an outer clad layer, wherein such fiber is produced by a process which comprises the sequential steps of:
   A. producing a preform polymer optical fiber by simultaneously extruding first and second layers of polymer materials and an outer clad layer of a polymer material; wherein the first polymer material layer has a predetermined optical refractive index and forms the fiber core, the second polymer material layer encircles the fiber core and has an optical refractive index which is lower than such index of the first layer, and the outer clad layer encircles the second layer and has an optical refractive index which is lower than such index of the second layer; and wherein the first, second and clad layers are arranged in a concentric configuration;
   B. cooling the preform polymer optical fiber;
   C. heating the preform polymer optical fiber to a temperature to effect fusing of the polymer layers at their respective interfaces;
   D. drawing the heated preform polymer optical fiber to a predetermined diameter; and
   E. cooling the multi-layer polymer optical fiber, whereby such fiber has a graded optical refractive index profile.

9. A multi-layer polymer optical fiber as defined by claim 8 wherein each of the first, second and clad layers of polymer materials has a graded optical refractive index of from about 1.2 to about 1.95.

10. A multi-layer polymer optical fiber as defined by claim 8 wherein the polymer optical fiber has a graded optical refractive profile having an alpha value of from about 1.8 to about 3.0.

11. A multi-layer polymer optical fiber as defined by claim 8 wherein the first polymer material layer is a polycarbonate.

12. A multi-layer polymer optical fiber as defined by claim 8 wherein the second polymer material layer is a polycarbonate.

13. A multi-layer polymer optical fiber as defined by claim 8 wherein the outer clad layer is an acrylic polymer.

14. A multi-layer polymer optical fiber as defined by claim 13 wherein the acrylic polymer is polymethyl methacrylate.

15. A process for the manufacture of a multi-layer polymer optical fiber having a graded optical refractive index profile and being comprised of an inner fiber core layer, an outer clad layer and one or more intermediate layers arranged in a concentric configuration, wherein the process comprises the sequential steps of:
   A. producing a preform polymer optical fiber by extruding an inner core layer, an outer clad layer and one or more intermediate layers, each layer being formed of a polymer material; wherein the fiber core layer has a predetermined optical refractive index, wherein each intermediate layer encircles the fiber core and each immediately preceding intermediate layer, wherein each intermediate layer has an optical refractive index which is lower than such index of the fiber core layer and each immediately preceding intermediate layer, wherein the outer clad layer encircles the last intermediate layer and has an optical refractive index which is lower than such index of the last intermediate layer, and wherein the inner core layer, the outer clad layer and each intermediate layer are arranged in a concentric configuration;
   B. cooling the preform polymer optical fiber;
   C. heating the preform polymer optical fiber to a temperature to effect fusing of the polymer layers at their respective interfaces;
   D. drawing the heated preform polymer optical fiber to a predetermined diameter; and
   E. cooling the multi-layer polymer optical fiber, whereby such fiber has a graded optical refractive index profile.

* * * * *